Figure 1:
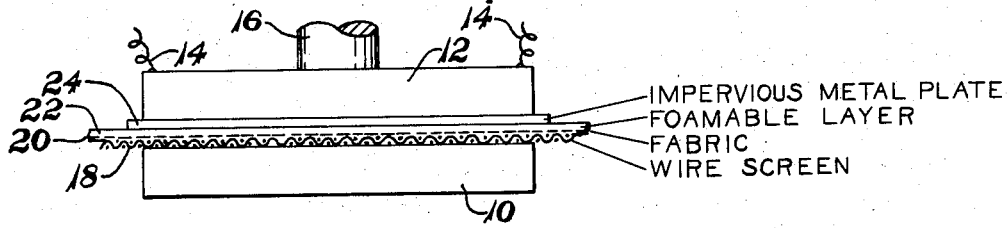

July 14, 1959   R. J. WILHELM ET AL   2,894,855
METHOD OF MAKING BREATHABLE VINYL RESIN COATED FABRIC
Filed April 19, 1956

INVENTORS
ROBERT J. WILHELM
CHARLES A. WAUGAMAN
BY R. W. Wilson
ATTY.

United States Patent Office 2,894,855
Patented July 14, 1959

2,894,855

METHOD OF MAKING BREATHABLE VINYL RESIN COATED FABRIC

Robert J. Wilhelm, Elyria, and Charles A. Waugaman, Avon Lake, Ohio, assignors to The B. F. Goodrich Company, New York, N.Y., a corporation of New York Application April 19, 1956, Serial No. 579,297

8 Claims. (Cl. 117—103)

The present invention relates generally to a permeable, resin-coated fabric. More specifically the invention relates to a fabric article having a coherent, vinyl resin coating, which article is characterized by being readily permeable to vapor.

There has been a steady increase in the use of resin-covered fabrics for upholstery and for decorative paneling, coverings, etc. A large use of such materials is as an automotive seat covering or trim. Since most vinyl resins are highly impermeable to moisture, upholstered seats, chairs, etc. are apt to be uncomfortable since the moisture vapor generated by perspiration is trapped and condensed in a person's clothing. Unlike the coated fabrics, natural leathers, even some of the coated, glazed or otherwise finished forms thereof, are somewhat permeable to moisture vapors and perspiration can escape in the form of vapor. The permeability of natural leather is one of the reasons why the natural product is still employed in large quantities in shoes, jackets, upholstery and other applications involving close contact with the human body.

Leather-like materials having a slight permeability are made by mechanically perforating or punching a vinyl resin-coated fabric. However, the appearance of the material is adversely affected and only a limited permeability can be imparted in this manner due to mechanical inability to make sufficiently fine and sufficiently numerous and closely-spaced perforations. In the copending application of D. V. Sarbach, Serial No. 447,857, filed August 4, 1954, now U.S. Patent No. 2,809,900, there is disclosed a process for producing a breathable or permeable vinyl resin-coated fabric or unsupported film. The latter process includes the steps of (1) incorporating a finely-divided soluble salt in the vinyl resin, (2) applying the vinyl resin to the fabric, (3) washing to extract the salt, and (4) drying. While this process produces a product having enhanced permeability, the multiplicity of steps makes the product too expensive for many applications.

In accordance with the present invention, we have found that a resin-coated fibrous sheet (woven, unwoven, belted or matted) having a very high degree of permeability to vapor is produced by an inexpensive, essentially two-step process comprising applying a layer of a foamable resinous or rubbery coating composition such as a plastisol, organosol, hydrosol or latex coating and causing the layer of coating composition to blow while under mechanical constraint imposed by means of (1) a pervious restraining means such as a foraminous surface or wire grid placed in direct contact with the uncoated surface of the coated sheet and (2) an impervious restraining means such as an impervious metal surface placed in contact with the coating layer. As liberation of gases or vapors proceeds, the mechanical restraint will cause the gases to seek escape. Since the gases can not escape through the impervious restraining surface, the pressure will cause them to migrate toward the pervious restraining surfaces, the gases passing through the interstices of the fibrous sheet and out through the pervious restraining surface. The product is a fibrous sheet having a continuous surface punctured by a multitude of very fine perforations or channels which are virtually invisible by reflected light. A great many of the perforations appear to be aligned with the interstices of the fibrous sheet. Under certain conditions and depending to some degree on the thickness of the coating, the perforations appear to pass entirely through the coating and fibrous layers since the sheet will transmit pinpoints of light. The latter type of perforations seems to be formed by gas bubbles forming on the impervious surface and expanding through the entire vinyl coating layer. With thicker coatings light is not transmitted indicating possibly that the pores are bent slightly or interconnected in some way. The very high permeability of the products is easily demonstrated by the extreme ease with which cigarette smoke can be blown through the coated sheet. More precise measurements of permeability performed on 5 inch discs of coated stockinet type fabric indicates air permeabilities of between about 5000 and about 20,000 cc. of air/hr. under a pressure of only 0.1 lb./sq. in.

Visual examination of the coated sheet under ultraviolet light indicates the perforations are distributed over the entire sheet. When examined under a microscope in an edge-on section, it is seen that many of the perforations pass entirely through the coating and the vinyl resin surrounding many of the perforations appears to be driven appreciably deeper into the fabric than is the surrounding coating material. Depending on the coating composition employed, the kind and proportion of blowing agent, the thickness of the coating, the pressure exerted during blowing and various other factors, the breathable coating sometimes will not only contain closely-spaced perforations or pore-like channels, but also an otherwise substantially closed-cell cellular structure which seems to contribute softness and excellent "hand" to the coated sheet.

By the terms "foamable coating composition" or "blowable coating composition," as employed herein, is meant any non-foamy or non-foamed composition that can be coated onto a fibrous sheet by spreading, roll-coating, dipping, calendering or other means. Most convenient are the more or less fluid types (as distinguished from the solid) of coating compositions which can be applied by spreading or roll-coating techniques. Among the latter types are vinyl resin plastisols, organosols and hydrosols or latices, the polyesters, the alkyls, the polyurethane type resins, and others. Since the composition is not applied as a foam, the composition should usually contain a blowing or foaming agent such as a decomposable chemical that will liberate gases or vapors, or a dissolved or absorbed volatile substance that can be volatilized or liberated in a controlled manner. Foamable vinyl resin plastisols and organosols are preferred. By the term "fibrous sheet," as employed herein, is meant a more or less porous sheet composed of fibers which are woven, unwoven, matted or felted, impregnated and the like, such as any porous fibrous sheet capable of functioning as a reinforcing or backing sheet, which will be permeable to gases and vapors, which is sufficiently coherent to be handled in the coating and blowing operations, and which will function as a porous support or carrier for the coating of the foamable coating composition.

The blowing and perforation of the coating layer can be initiated under pressure exerted by the opposed restraining surfaces or the coated sheet may be placed between closely-spaced surfaces to allow pressure to be generated by the blowing agent. However, to prevent large bubbles and blemishes, to produce finer and more closely-spaced perforations, and to prevent the formation of a too highly cellular structure (closed-cell structure in addition to perforations or channels), it is desirable to initiate blowing under at least moderate pressures of 50 to 2000 lbs./sq. in. Higher pressures of up to 20,000 lbs./sq. in. or more may be employed if desired. The pressure does not appear highly critical since all that is required is to confine the coating to cause a substantially unidirectional escape of gas toward the previous restraining surface. Pressures of about 1000 lbs./sq. in. produce a substantially solid coating containing perforations or channels and having permeabilities ranging from about 5000 to over 20,000 cc. of air/hr. (5 inch disc at 0.1 lb./sq. in. pressure).

With the preferred vinyl resin plastisols and organosols derived from finely-divided polymers and copolymers of vinyl chloride, vinylidene chloride, vinyl acetate, methyl acrylate, methyl methacrylate, ethyl acrylate, acrylonitrile, styrene and others (most preferred polyvinyl chloride), the permeability of the coating is somewhat dependent on formulation. For example, the type and proportions of blowing agent, or agents, and the types and proportions of plasticizers, fillers, pigments, stabilizers, coloring agents, solvents, thinners, thickeners and other conventional compounding ingredients all exert an effect, to a greater or lesser degree, on the permeability of the final coated fabric. As the amount of a given blowing agent is increased, an increase in permeability is usually obtained, although the relationship does not always appear to be proportional or linear over the practical range of proportions. The proportion of blowing agent may vary from as little as 0.1 percent by weight to as much as 20 percent by weight or more, based on the weight of vinyl resin. Usually, however, most common blowing agents will produce a practical range of permeabilities when employed in amounts ranging from 0.5 to 10 percent.

In the method of this invention any blowing agent can be used. Where the plastisol is applied to the backing sheet and then heated to effect more or less simultaneous blowing and fusion, it may be desirable to employ a chemical blowing agent having a decomposition temperature in the range of at least 200–300° C. Such materials will allow a resin plastisol to at least partially thicken or fuse before all the blowing gas has been driven off. The partially thickened state may be required to prevent collapse of the perforations or channels until fusion is complete. However, if a thixotropic or gellable plastisol is employed, it is possible to cause liberation of gas (and perforation of the sheet) at a lower temperature and then fuse the resin in a subsequent stage of manufacture. Illustrative blowing agents include sodium bicarbonate and other substances liberating $CO_2$ gas; nitrogen-liberating substances such as diazoaminobenzene ("Unicel"), dinitroso-pentamethylenetetramine ("Unicel ND"), p,p'-oxybis-(benzenesulfonyl hydrazide) ("Celogen"), N,N'-dimethyl-N,N'-dinitroso-terephthalamide ("BL 353"), and 1,3-bis-(o-xenyl)-triazine; hydrogen-liberating substances such as the Na-, K-, Rb-, and Ce-borohydrides; water; and many others. The use of the hydrogen-liberating alkali-metal borohydrides are more fully disclosed in copending applications Serial Nos. 553,747 and 553,684, filed December 19, 1955.

The proportions of other compounding ingredients will depend on the viscosity desired during coating, on the thickness of the coating desired and on the properties desired. For example, when the vinyl resin is applied to the fabric as a paste-like dispersion in plasticizer, the proportion of plasticizer may range up to 75 percent by weight or more, based on the resin content, although from about 35 to about 60 percent will usually produce workable viscosities. When applied as an organosol (a dispersion of resin in a mixture of plasticizers and solvents and/or thinners), or as a hydrosol (a dispersion of resin and plasticizer in water), less plasticizer may be employed, depending on the amount of solvent, thinner or water present. For the latter applications, from about 1 to about 50 percent more of solvents and/or thinner, and/or water, and 20 to 50 percent of plasticizers can be employed. The plasticizers employed for the above uses may be monomeric and/or polymeric in nature ranging from monomeric materials such as tricresyl phosphate, dioctyl phthalate, dioctyl adipate, didecyl phthalate, and the like, to polymeric materials such as polyesters, epoxidized polyesters, low molecular weight polymers and copolymers, and the like. Solvents and thinners may be toluene, xylene, hexane, mineral spirits, and many others.

As specific examples of the above-described process, a stockinet type of light weight, knitted cotton fabric is coated with a 6 mil coating of a polyvinyl chloride plastisol formulation having the following composition:

| Material: | Parts wt. |
|---|---|
| Polyvinyl chloride [1] | 100.0 |
| GP 261 | 7.5 |
| GP 233 | 40.0 |
| G–50 | 7.5 |
| CC–55 | 15.0 |
| Dyphos | 3.0 |
| Blowing agent [2] | 5.0 or 7.5 |
| RA–10 | Up to 1.0 |
| Grello #3850 | Up to 0.5 |
| Phthalocyanine green | Up to 0.5 |
| Phthalocyanine blue | Up to 0.5 |

[1] A fine paste type resin known as "Geon 121."
[2] N,N'-dimethyl-N,N'-dinitroso-terephthalamide.

The coated fabric is then placed between (1) a solid, ferrotype plate placed in direct contact with the plastisol coating and (2) a piece of ordinary wire window screen in contact with the uncoated side of the fabric. The assembly is then placed in a press and a pressure of about 1000 lbs./sq. in. exerted thereon while applying heat at 350° F. After 10 minutes in the press the assembly is removed from the press, cooled and the wire screen and ferrotype plate are stripped away. In each case a smoothly coated sheet of fabric is obtained which has a very high permeability. The latter is easily demonstrated by blowing cigarette smoke through the coating and fabric. Similar samples made with the same formulation but using in place of the smooth ferrotype plate a metal plate having a leather-like embossed finish produces a smooth, leather-finished coated sheet, also of high permeability. When a 5 inch disc of a leather-finished sample made with 5 percent blowing agent is clamped in an air chamber and an air pressure of 0.1 lb./sq. in. applied to the face of the coating, 5000 cc. of air per hour passes through the coated sheet. Similarly, with a sheet coated with the plastisol containing 7.5 percent blowing agent, the permeability of the 5 inch disc is about 15,000 cc./hr. These samples do not transmit light and are resistant to the passage of liquids. Other samples of the same fabric coated with a thinner coating and/or a higher proportion of blowing agent are even more permeable to air or vapors and are more or less readily penetrated by liquid water. The coating layer of the latter type samples, on microscopic examination of an edge-on section, surprisingly, are found to have a substantially solid structure with pore-like channels extending entirely through the resin and fabric layers. Under a microscope the vinyl resin surrounding some of the pore-like channels is seen to be driven deeply into the fabric so as to hold the air channels open. When the sheet is viewed in transmitted light, the straight-through nature of the channels is plainly visible as a multiplicity of pin-points of light.

Figure 2:
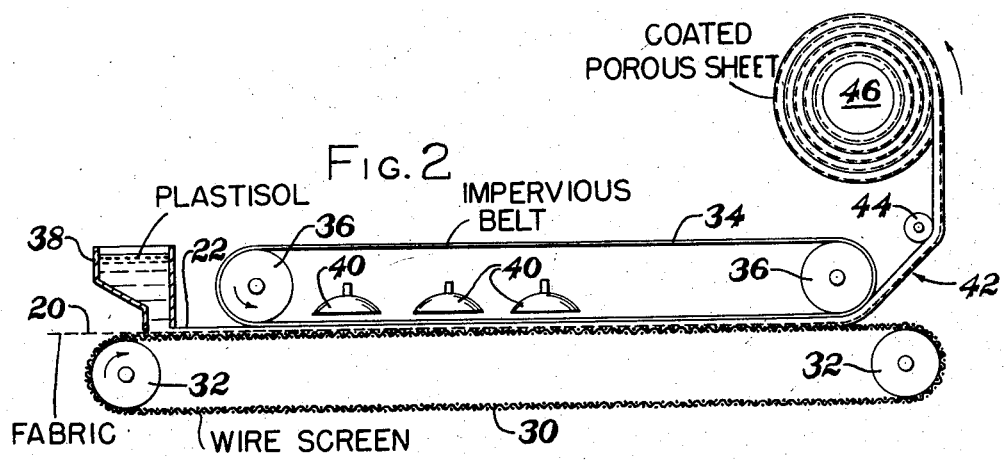

In the accompanying drawings, Fig. 1 is an end elevational view looking at the platens of a press showing the pervious and impervious restraining surfaces; Fig. 2 is an elevational view, partially schematic, of a machine employing a continuous, impervious metal restrainer belt and a continuous wire screen sheet-carrying, restrainer belt; and Fig. 3 is an elevational view, partially schematic, of a rotating, heated drum having a pervious surface and a continuous metal belt trained to force the coated fabric against the drum.

Referring now to the drawings, in Fig. 1 there is shown a press platen assembly comprising a lower platen 10, which may or may not have means for heating, and an upper platen 12 which has electric heating means 14 and is attached to a hydraulic ram 16 so as to be capable of being forced down against lower platen 10. Between the platens 10, 12 there is an assembly comprising a pervious metal sheet 18, illustrated as a sheet of wire screen, a layer of fabric 20 having a coating or layer 22 thereon of a foamable coating composition and, in direct contact with the layer 22, an upper plate 24 which is imperforate and may be embossed with any desired leather-like or other finish design. The plate 24 also can be a polished metal plate such as a ferrotype plate. The wire screen sheet 18 can be any perforate or porous material such as heavy textile or metal fabric, porous metal or screen-like material having a more or less uniform porosity to the passage of air and gases.

The sheet 20 of fabric, having for example, a coating 22 of polyvinyl chloride plastisol containing a chemical blowing agent, is placed on top of the screen 18 with the metal plate 24 laid directly on top of the plastisol layer, the assembly placed between platens 10, 12 and a pressure of 1000 lbs./sq. in. applied thereto while heat is applied for about 10 minutes by means of platen 12 so as to heat the resin coating to about 350° F. The resulting breathable leather-like product is described more fully above.

Figure 3:
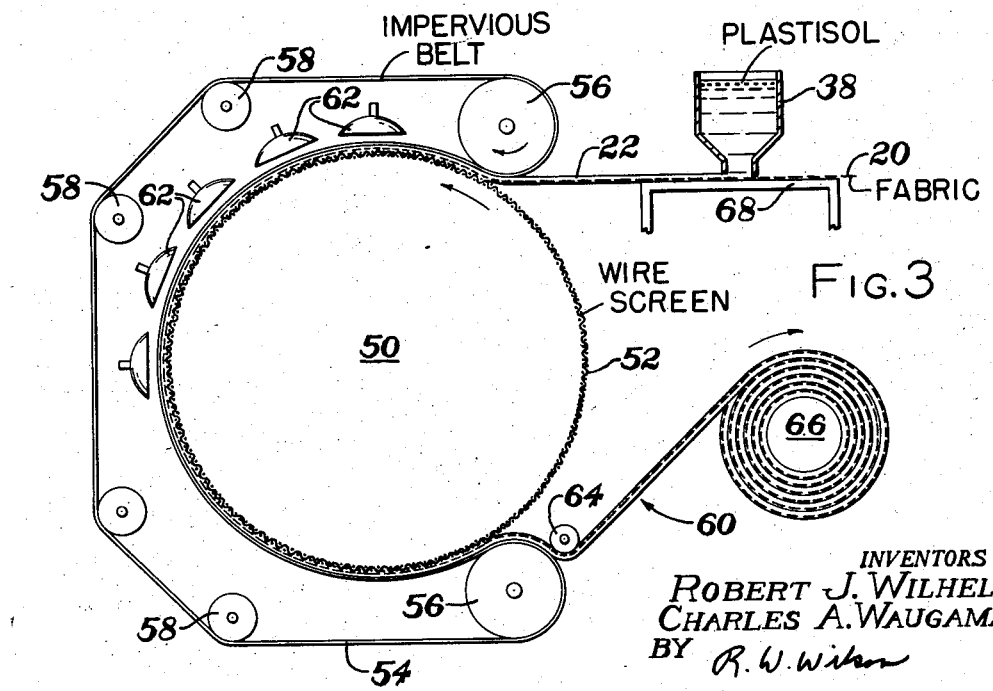

In Figs. 2 and 3 several forms of apparatus are shown for carrying out the method of this invention in a continuous manner. In Fig. 2 there is shown a belt-style machine in which a screen wire belt 30 is trained over a pair of lower rollers 32, one of the latter being driven. Above belt 30 there is supported a continuous upper belt 34 of impervious metal which is trained over rollers 36. Likewise, one of the rollers 36 may be driven in synchronism with the driven lower roller 32. At the left hand end of the screen belt 30 there is provided a spreader mechanism 38 which applies a coating 22 of foamable vinyl resin or other material to a sheet 20 of fabric. The latter is brought in from a supply roll (not shown) and laid on top of screen belt 30 which carries it through the spreader 38. As the lower screen belt 30 progresses in the direction indicated, it passes under the upper belt 34 which applies a pressure to the coated fabric. Infrared lamps 40 heat the belt 34 so as to raise the temperature of the coating 22 and cause foaming gas to be liberated and the vinyl resin (plastisol, for example) to fuse. Following the last of lamps 40 there is a length of belt 34 where considerable cooling of the belt and coated fabric can occur. The perforated resin-coated fabric 42 then passes out from between the belts where a stripper roll 44 strips it from the screen belt 30 and metal belt 34. A take-off roll 46 is provided to roll up the finished material. In Fig. 2 the positions of the two belts could be reversed and a roll coater employed to apply the resin coating to the underside of the fabric.

In Fig. 3 still another apparatus for continuous operation is shown. In this form a large drum 50 is provided having a screen wire surface 52. A continuous, impervious belt 54 of metal is trained over drive rollers 56 which are synchronized with a drive system (not shown) for the rotation of drum 50. Smaller idler rollers 58 are provided to form an outer return path for the belt 54. With the drive rollers 56 positioned on either side of the drum and to the right of the vertical diameter of the drum, the belt 54 is placed under stress so as to apply pressure to a coated fabric sheet 60 placed between the latter and the screen-like surface 52 of drum 50. The entrance portion of the belt 54 is heated by infrared lamps 62 while a considerable portion of the exit end of belt 54 can cool to facilitate stripping of the breathable sheet 60. Forced cooling can be applied if desired. As in Fig. 2 stripper roll 64 and take-up roll 66 are provided to strip the finished product and roll it up. Like the apparatus of Fig. 2 the positions of the screen wire 52 and solid belt 54 can be reversed with the belt 54 secured directly to the drum. With this arrangement sectored internal heating and/or cooling zones can be provided inside the drum. A roller coater then could be utilized to coat the underside of the fabric.

In the apparatus of Fig. 3, the sheet of uncoated fabric 20 is fed onto a table 68 of a spread coater 38 which applies the coating 22 to the fabric. The product is as described above.

By suitable variation in the fibrous or fabric backing, in the thickness of coating, the amount of blowing agent, the proportion of plasticizers, fillers, etc., the properties and porosity of the coated sheet can be varied to adapt it to use in upholstery material, as material useful in shoes, jackets, coats and other items of apparel, and the like. Perforated sheets having an appreciable resistance to penetration by liquids can be used to make comfortable rainwear for warm weather use. Shower curtains made of this material will permit the escape of steam from the shower stall. Many other uses for this material exist which make use of its permeability to vapor and gas, its abrasion resistance, resistance to staining, weather, etc.

We claim:

1. A method for making a breathable sheet material which comprises applying a layer of a foamable coating composition to one surface of a sheet of porous fibrous material, interposing said coated sheet between two restraining means, one of said means being impervious and is placed in direct contact with said layer of coating composition and the other of said means being pervious and is placed in contact with the uncoated side of said sheet of fibrous material, and causing said layer of coating composition to foam while under mechanical restraint imposed by said two restraining means, thereby to force escape of foaming gas from said layer through said fibrous material and said pervious restraining means.

2. A method as defined in claim 1 wherein pressure is exerted on said coating layer while said foaming takes place.

3. A method comprising applying a layer of a foamable vinyl resin coating composition to one side of a porous sheet of fibrous material, interposing the resulting coated sheet between (1) an impervious restraining surface placed in direct contact with said vinyl resin layer and (2) a pervious restraining surface placed in contact with the uncoated side of said sheet, and applying heat to said vinyl resin layer to cause it to foam while maintaining the spacing of said surfaces.

4. A method as defined in claim 3 wherein pressure is exerted by said surfaces on said coated sheet while foaming is taking place.

5. A method comprising applying a layer of a foamable coating composition, comprising a dispersion of vinyl resin in plasticizer, to one side of a porous sheet of fibrous material, applying the resulting coated sheet to an impervious surface with the vinyl resin layer in direct contact therewith, applying a pervious restraining surface to the uncoated side of said coated sheet, exerting pressure between said surfaces on said coated sheet, and applying heat to said coated sheet to initiate foaming and fusion of said vinyl resin layer while the latter is restrained by the pressure exerted between said surfaces.

6. A method which comprises applying a coating of a coating composition including a finely-divided vinyl resin, plasticizer and a blowing agent to one side of a sheet of porous fibrous material, applying pressure to the resulting coated sheet by means of (1) an impervious surface placed in direct contact with said coating and (2) a pervious surface placed in contact with the uncoated side of said coated sheet, and applying heat to said coated sheet while under restraint imposed by the pressure of said surfaces so as to initiate generation of gas by said blowing agent and fusion of said composition to cause a unidirectional escape of gas through said coating, said porous sheet and said pervious restraining surface.

7. A method as defined in claim 6 wherein said vinyl resin coating composition is a polyvinyl chloride plastisol.

8. A method as defined in claim 6 wherein said fabric is continuously fed between a pair of moving pressure-exerting surfaces of the character described, said surfaces and said coated sheet are successively conducted through heating and cooling zones, and said coated sheet is stripped from said surfaces.

References Cited in the file of this patent

UNITED STATES PATENTS

| | | |
|---|---|---|
| 2,217,137 | Roth | Oct. 8, 1940 |
| 2,506,249 | Tammen | May 2, 1950 |
| 2,517,753 | Ximenez | Aug. 8, 1950 |
| 2,563,478 | Mason | Aug. 7, 1951 |
| 2,570,182 | Daly | Oct. 9, 1951 |
| 2,649,391 | Alderfer | Aug. 18, 1953 |

UNITED STATES PATENT OFFICE
CERTIFICATE OF CORRECTION

Patent No. 2,894,855                      July 14, 1959

Robert J. Wilhelm et al.

It is hereby certified that error appears in the printed specification of the above numbered patent requiring correction and that the said Letters Patent should read as corrected below.

Column 3, line 9, for "substantially undirectional" read -- substantially unidirectional --.

Signed and sealed this 5th day of January 1960.

(SEAL)
Attest:

KARL H. AXLINE
Attesting Officer

ROBERT C. WATSON
Commissioner of Patents